United States Patent [19]
Williams

[11] Patent Number: 5,224,241
[45] Date of Patent: Jul. 6, 1993

[54] GATE HINGE ASSEMBLY

[75] Inventor: Jeffery D. Williams, Rio Rico, Ariz.

[73] Assignee: Wedge-Loc Co., Inc., Rio Rico, Ariz.

[21] Appl. No.: 844,213

[22] Filed: Mar. 2, 1992

[51] Int. Cl.⁵ .......................... E05D 5/02; E05D 5/06
[52] U.S. Cl. ...................................... 16/253; 16/392; 16/380
[58] Field of Search ........................ 16/253, 392, 380

[56] References Cited
U.S. PATENT DOCUMENTS

| | | |
|---|---|---|
| 812,690 | 2/1906 | Singer . |
| 1,469,425 | 10/1923 | Mehanna . |
| 2,644,258 | 7/1953 | Gillette .................. 16/392 |
| 2,970,799 | 2/1961 | Pinson .................... 16/253 |
| 3,811,149 | 5/1974 | Griffin . |
| 3,820,758 | 6/1974 | Berg et al. . |
| 4,077,611 | 3/1978 | Wilson . |
| 4,729,149 | 3/1988 | Brunkan . |
| 4,905,968 | 3/1990 | Eby et al. . |
| 5,020,190 | 6/1991 | Mueggerl . |
| 5,046,705 | 9/1991 | Williams . |

Primary Examiner—John Sipos
Assistant Examiner—Carmine Cuda
Attorney, Agent, or Firm—LaValle D. Ptak

[57] ABSTRACT

A gate hinge member is designed for attachment to a metal T-post fence post. The gate hinge comprises at least one pair of first and second L-shaped hinge members, which are secured by means of a U-shaped fastener to the T-post in a tight wedged relationship. The spacing between the hinge members is selected to accommodate a hinge pin, which is passed through a pair of spaced holes in hinge-pin holding plates of the first and second hinge members. The hinge-pin holding plates extend outwardly perpendicular to the T-post. The hinge pin is adapted to be passed through a mating cylindrical hinge member on the gate to pivotally secure the gate in place between the hinge members. After assembly, the hinge pin is releaseably secured in place by means of cotter pins passed through holes adjacent each of the ends of the hinge pin. The gate hinge may be placed in any vertical position on the face of a T-post, and cannot accidently be dismantled.

17 Claims, 2 Drawing Sheets

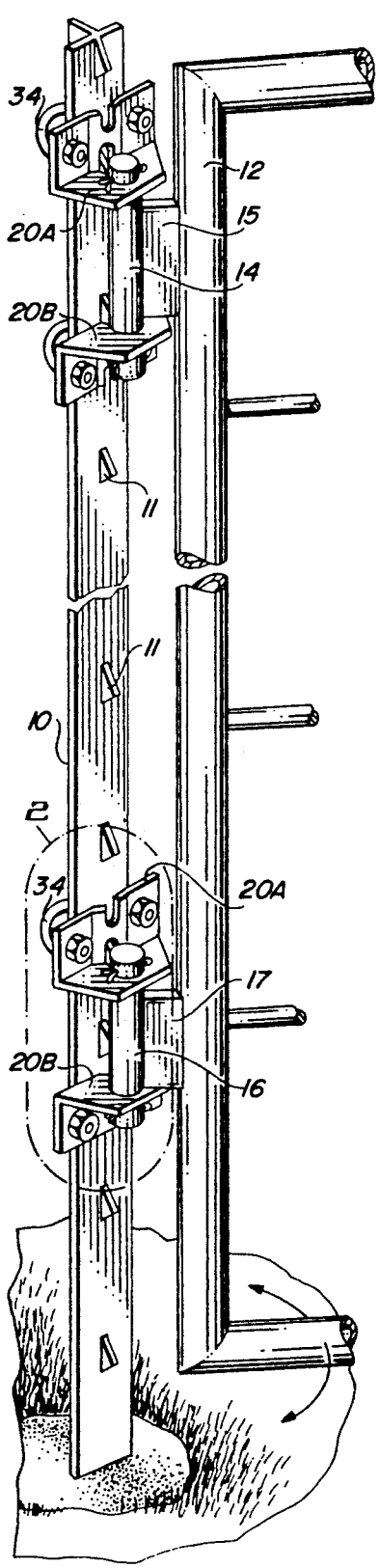
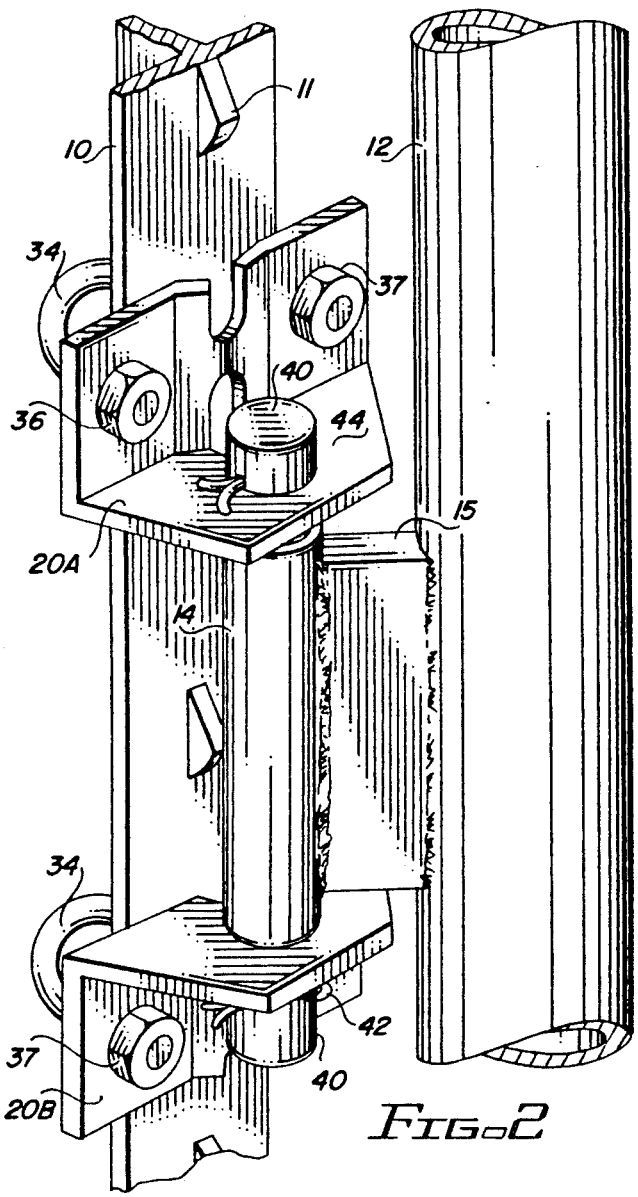
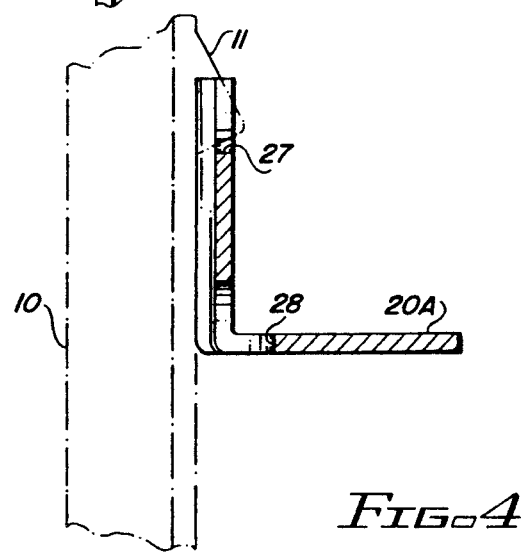
FIG. 1
FIG. 2
FIG. 4

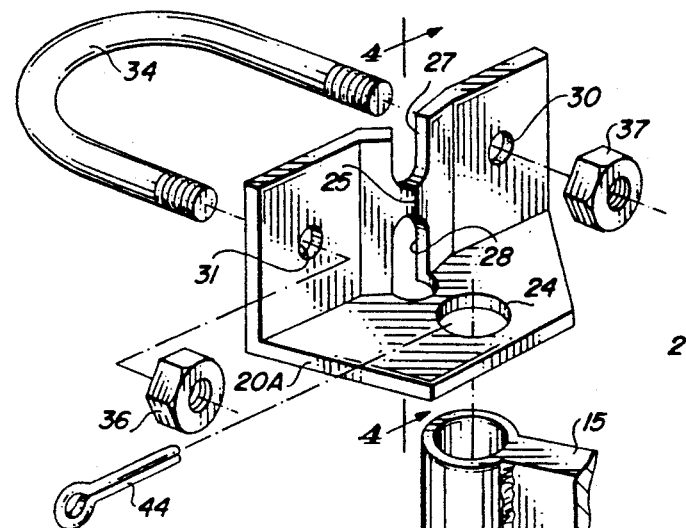
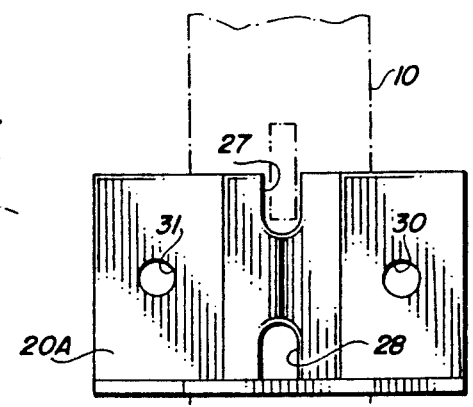
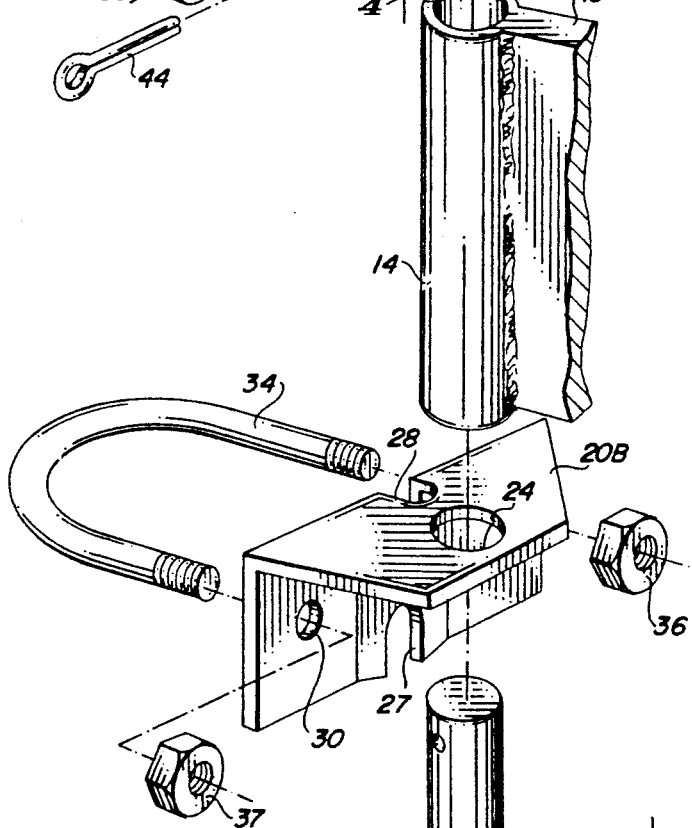
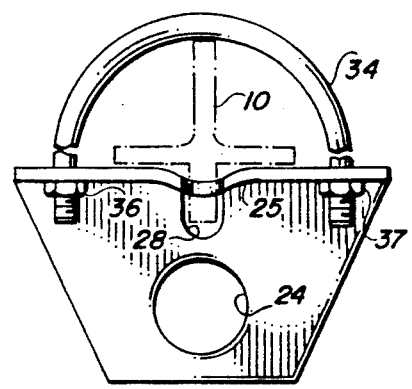
FIG. 5
FIG. 6
FIG. 3

GATE HINGE ASSEMBLY

BACKGROUND

A variety of different gate post hinge assemblies have been developed for hinging relatively heavy gates across entrances in fenced areas. Typically, such gates are used to function as entrance gates for pastures, arenas and the like. Some pastures and arenas are fenced by rail and post fences made of wood or tubular steel and the like. Other pastures and some arenas use T-post fences. Where T-posts are strung with wire, separate heavy-duty wood or tubular steel gate posts typically have been employed for supporting gates on hinges attached to the gate posts.

Efforts have been made to devise relatively simple constructions for the hinge members used on gate posts and gates. One of the problems, which typically exists, is the destructive forces exerted on the gates by the animals generally confined within the area closed by the gate. Animals frequently rub against, lean on, or push upwards on gates in ways which can dislodge the gates from the support pins or dislodge hinge-pins out of the brackets for the hinges typically used for such gates.

The patent to Mueggerl No. 5,020,190 discloses a gate hinge bracket assembly, which is mounted on a tubular pipe of a gate. The gate post, itself, has upwardly turned hinge-pins attached to it. The gate post in Mueggerl is disclosed as a wooden post. The hinge-pins on the post engage upper and lower brackets, which are mounted on the gate itself. The brackets are attached to the gate by means of U-shaped fasteners, which tighten the brackets against the gate, and form a distortion or bending of the pipe used for the gate in the area of attachment to cause the hinge member to be held in place on the tubular gate member in a way which inhibits twisting and an up-and-down movement of the hinge member on the pipe of the gate. The bracket itself, which is used in this patent, includes a pair of spaced-apart plates with a hole through them; and when the hinge-pin is inserted upwardly through the aligned holes in the two plates, the friction force of the edges of the holes on the hinge-pin is intended to prevent upward movement of the gate relative to the pin. Since the upper end of the pin, however, is open, it is possible for an animal to lift the gate off the pin under some conditions.

Another patent, to Griffen U.S. Pat. No. 3,811,149, is directed to a somewhat more complex hinge assembly for use with pipe fencing. The Griffen patent uses a U-bolt to clamp the hinge accessory onto the post. This patent is primarily directed to structure which permits an adjustment of the proximity of the hinge-pin to the post, once the hinge assembly is attached to the post.

An earlier patent, Mehanna U.S. Pat. No. 1,469,425, discloses a gate hinge assembly for attachment to a wooden post. The assembly of Mehanna employs a structure which is similar in arrangement and operation to the structure of the hinge assembly of the Mueggerl patent discussed above.

Another patent, Brunkan U.S. Pat. No. 4,729,149, is directed to a gate hinge assembly for use on cylindrical pipe. The assembly structure of this patent includes several different parts, and is relatively complex.

None of the foregoing patents, however, discloses a gate hinge assembly which can be used on the popular steel T-post fence post, which is in widespread use throughout the United States and other countries of the world. Typically, when a T-post fence is constructed, a separate wooden or steel pipe post is used in the gate opening to form a support post for the gate post hinge.

It is desirable to provide a hinge assembly which can be used directly on a T-post fence post, which is easy to install, which is capable of supporting relatively heavy gates, and which prevents the hinge member, the gate, and the hinge-pin from accidentally being moved or dislodged.

SUMMARY OF THE INVENTION

It is an object of this invention to provide an improved gate post hinge assembly.

It is another object of this invention to provide an improved hinge assembly for use on T-post fences.

It is an additional object of this invention to provide an improved easy-to-install gate post hinge assembly for use on T-post fence posts.

It is a further object of this invention to provide an improved gate hinge member for attachment to a T-post fence post, which is easy to install, position, and use.

In a preferred embodiment of the invention, a gate hinge member, which is adapted for attachment to a gate post, comprises first and second L-shaped hinge members. These members are secured to a fence post in a spaced-apart relationship. Each of the hinge members has a hinge-pin holding plate extending outwardly from the post substantially perpendicular to the post. The spaced-apart hinge-pin holding plates each have a hole through them; and the holes on each of the plates are oriented in vertical alignment with one another A hinge-pin then is extended through the holes in the hinge-pin holding plates, and extends across the space between the plates. The hinge-pin is releaseably secured against removal from the holding plates. Typically, the pin is inserted through a corresponding mating hinge member, which is attached to the gate supported by the hinge members.

BRIEF DESCRIPTION OF THE DRAWINGS

FIG. 1 is a perspective view of a preferred embodiment of the invention installed on a T-post fence post;

FIG. 2 is an enlarged view of the encircled area 2 of FIG. 1, showing details of the preferred embodiment of the invention;

FIG. 3 is an exploded view of the embodiment shown in FIG. 2; and

FIGS. 4, 5 and 6 are side, front and top views, respectively, of a portion of the embodiment shown in FIGS. 1, 2 and 3.

DETAILED DESCRIPTION

Reference now should be made to the drawing, in which the same reference numbers are used throughout the different figures to designate the same or similar components. FIG. 1 shows a typical steel T-post 10 driven into the ground in a location where it is desired to use the post 10 as a gate post. As is well known, a T-post fence post includes a number of vertically spaced projections 11 on the front center of the face of the T-post. The front face of the T-post otherwise is generally relatively flat, or may be slightly concave, depending upon the manufacturer. Opposite the projections 11, is a rearwardly-extending vertical flange, which is perpendicular to the face of the post 10. This configuration is shown most clearly in cross-section in dotted lines in the top view of FIG. 6.

To mount a gate 12, illustrated in part in FIG. 1, on hinges supported by the post 10, a pair of identical spaced-apart hinge members 20A and 20B are provided. In FIG. 1, two sets of these brackets are illustrated. One set or pair of members 20A and 20B is shown connected to the T-post 10 near the upper end of the post, while the other set is illustrated connected to the T-post 10 near its lower end. As is readily apparent from FIGS. 1, 2 and 3, the members 20A and 20B are identical, but are mounted on the fence post in a mirror image relationship, that is, the lower member 20B is inverted with respect to the orientation of the member 20A.

The brackets 20A and 20B each include a rear flat plate, which is placed against the face of the T-post 10, and is secured to the T-post by means of a U-shaped fastener or U-bolt 34. The bight of the U-bolt fastener 34 extends around the vertical flange on the rear of the T post; and the ends extend through a pair of holes 30 and 31, respectively, in the rear plate of the member 20A and 20B. A pair of nuts 36 and 37 then are secured to the ends of the U-bolt 34 to tightly draw each of the hinge members 20A and 20B into engagement with the front surface of the T-post 10. The tight friction engagement of the rear surfaces of the members 20A and 20B with the front of the T-post 10, under control of the U-bolts 34 securely attaches the members 20A and 20B to the post, and prevents them from vertical movement.

In addition, the members 20A and 20B each include a notch 27 near their upper end, and a notch 28 at the bight of the "L" of each member (as shown most clearly in FIG. 3). The notch 27 permits the member 20A or 20B to be adjusted in a position with a projection 11 of the T-post extending into either of the notchs 27 or 28. Consequently, the members 20A and 20B may be located in any position along the face of the T-post 10; so that the projections 11 on a T-post 10 do not limit the vertical orientation which may be effected by the hinge members 20A and 20B.

Each of the members 20A and 20B have a circular hole 24 formed through a hinge-pin support plate extending perpendicularly outward from the face of the T-post 10. When the members 20A and 20B are placed in position on the T-post, as shown in FIGS. 1 and 2, the holes 24 in each of the support plates of the members 20A and 20B are aligned.

To hang a gate 12 on hinges which are supported by the hinge members 20A and 20B, the gate 12 is moved into position to place a hollow cylinder 14 between the hinge-pin support plates of the members 20A and 20B (as shown in FIG. 3). The hinge cylinder 14 is attached to the pipe 12 of the gate by means of a short welded plated 15, or the hinge cylinder 14 may be welded directly to the pipe 12 of the gate, depending upon the relative dimensions of the different parts. In any event, the hinge cylinder 14 is moved into place between a pair of the hinge members 20A and 20B, as illustrated in FIG. 3. After this is done, a hinge-pin, in the form of an elongated cylindrical rod 40, is passed through the holes 24 in the hinge-pin support plates of the members 20A and 20B, and through the hollow center of the hinge cylinder 14 to the position shown in FIG. 2.

Adjacent both the upper and lower ends of the pin 40 are a pair of transverse cotter pin receiving holes. These holes are located so that they are below the lower surface of the hinge-pin holding plate of the member 20B and above the corresponding surface of the member 20A, as illustrated most clearly in FIG. 2. When the hinge-pin 40 is in place as shown in FIG. 2, a pair of cotter pins 42 and 44 are inserted in place and spread apart to lock the pin 40 in the position shown in FIG. 2. When this is done, the gate 12 is free to rotate about the pin 40 in a well known manner.

FIGS. 4, 5 and 6 illustrate the side, front and top of the hinge member 20A, showing its location relative to the T-post 10.

It is to be noted that the area of the back plate of the hinge members 20A and 20B, which is aligned with the projections 11, is outwardly bowed somewhat to form relief for use of the hinge members 20A and 20B with T-posts in which there is a slight vertical ridge in a vertical line extending between the projections 11. Some T-posts are manufactured with this type of configuration; and the outwardly bowed relief permits a tight connection of the hinge members 20A and 20B against the otherwise generally flat front face of the T-post to be effected.

The foregoing description of the preferred embodiment of the invention should be considered as illustrative, and not as limiting. Various changes and modifications will occur to those skilled in the art, without departing from the true scope of the invention as defined in the appended claims.

I claim:

1. A gate hinge for attachment to a metal fence T-post used as a gate post, including in combination:

first and second L-shaped hinge members adapted to be independently removably secured to a fence T-post in a spaced-apart relationship, each of said hinge members having a first vertical plate portion secured to a fence T-post and a hinge-pin holding plate extending outwardly from the post substantially perpendicular to the post, said first portion of said hinge members including openings for permitting said hinge members to be attached to said fence T-post over lugs extending from the front face of said T-post;

said hinge-pin holding plates of each of said first and second hinge members having a hole therethrough, the holes in said hinge-pin holding plates arranged for orientation in vertical alignment with one another;

a hinge-pin extending through the holes in the hinge-pin holding plates of said first and second hinge members, and across the space between said hinge-pin holding plates; and means for releasably securing said hinge-pin against removal from said hinge-pin holding plates.

2. The combination according to claim 1 wherein said hinge-pin is in the shape of an elongated cylinder having at least one cotter pin receiving hole perpendicular to the axis thereof, and located near one end thereof; wherein said means for securing said hinge-pin against removal from said holding plates comprises a cotter pin inserted through said cotter pin receiving hole.

3. The combination according to claim 2 wherein said hinge pin has cotter pin receiving holes perpendicular to the axis thereof, located adjacent each end thereof, for receiving cotter pins therethrough, said hinge-pin having a length sufficient to cause the ends thereof to extend beyond the hinge-pin holding plates of said first and second hinge members, such that with cotter pins inserted into both of said cotter pin receiving holes, said hinge-pin is restricted against axial movement thereof.

4. The combination according to claim 3 further including means for attaching said first portion of said hinge members to a post.

5. The combination according to claim 4 wherein said first portion of each of said hinge members has a pair of spaced-apart holes thereon, located at substantially equal distances from the hole through the hinge-pin holding plate, for receiving fastening means to attach said hinge member to a post.

6. The combination according to claim 5 wherein the holes in said first portion are spaced apart a distance at least equal to the width of a post to which said hinge member is to be attached, and further including attaching means in the form of a one-piece U-shaped bracket adapted to extend around the post and into the spaced-apart holes on said first portion, with said U-shaped bracket secured to said first portion.

7. The combination according to claim 1 wherein said hinge-pin is in the shape of an elongated cylinder having at least one cotter pin receiving hole perpendicular to the axis thereof, and located near one end thereof; wherein said means for securing said hinge-pin against removal from said holding plates comprises a cotter pin inserted through said cotter pin receiving hole.

8. The combination according to claim 7 wherein said hinge pin has cotter pin receiving holes perpendicular to the axis thereof, located adjacent each end thereof, for receiving cotter pins therethrough, said hinge-pin having a length sufficient to cause the ends thereof to extend beyond the hinge-pin holding plates of said first and second hinge members, such that with cotter pins inserted into both of said cotter pin receiving holes, said hinge-pin is restricted against axial movement thereof.

9. The combination according to claim 1 further including means for attaching said first portion of said hinge members to a post.

10. The combination according to claim 9 wherein said first portion of each of said hinge members has a pair of spaced-apart holes thereon, located at substantially equal distances from the hole through the hinge-pin holding plate, for receiving fastening means to attach said hinge member to a post.

11. The combination according to claim 10 wherein the holes in said first portion are spaced apart a distance at least equal to the width of a post to which said hinge member is to be attached, and further including attaching means in the form of a one-piece U-shaped bracket adapted to extend around the post and into the spaced-apart holes on said first portion, with said U-shaped bracket secured to said first portion.

12. A gate hinge for attachment to a metal T-post fence post used as a gate post, including in combination:

at least one pair of first and second L-shaped hinge members each having a first portion adapted to be secured to a fence T-post, and a second portion comprising a hinge-pin holding plate extending outwardly therefrom, said first and second L-shaped hinge members located a predetermined spaced distance apart on said T-post, with relief apertures in the first portion of said first and second hinge members to permit said hinge members to be attached to said fence T-post over lugs extending from the front face of said T-post;

means for securing the post-securing portion of said hinge members to said T-post;

a hole in each of said hinge-pin holding plates of said first and second hinge members, with the holes oriented in vertical alignment with one another;

a hinge-pin extending through the holes in said hinge-pin holding plates; and means for securing said hinge-pin against removal from said holding plates.

13. The combination according to claim 12 wherein said hinge-pin is an elongated cylinder, and the holes in the hinge-pin holding plates of said first and second hinge members are circular holes having a diameter sufficient to permit said hinge-pin to pass therethrough.

14. The combination according to claim 13 wherein said hinge-pin extends beyond the surfaces of said hinge-pin holding plates of said first and second hinge members, and wherein said means for securing said hinge-pin comprises means for releaseably securing said hinge-pin against axial movement thereof.

15. The combination according to claim 12 wherein said hinge-pin is in the shape of an elongated cylinder having at least one cotter pin receiving hole perpendicular to the axis thereof, and located near one end thereof; wherein said means for securing said hinge-pin against removal from said holding plates comprises a cotter pin inserted through said cotter pin receiving hole.

16. The combination according to claim 15 wherein said hinge pin has cotter pin receiving holes perpendicular to the axis thereof, located adjacent each end thereof, for receiving cotter pins therethrough, said hinge-pin having a length sufficient to cause the ends thereof to extend beyond the hinge-pin holding plates of said first and second hinge members, such that with cotter pins inserted into both of said cotter pin receiving holes, said hinge-pin is restricted against axial movement thereof.

17. The combination according to claim 12 wherein said hinge-pin extends beyond the surfaces of said hinge-pin holding plates of said first and second hinge members, and wherein said means for securing said hinge-pin comprises means for releaseably securing said hinge-pin against axial movement thereof.

* * * * *